Figure 1:
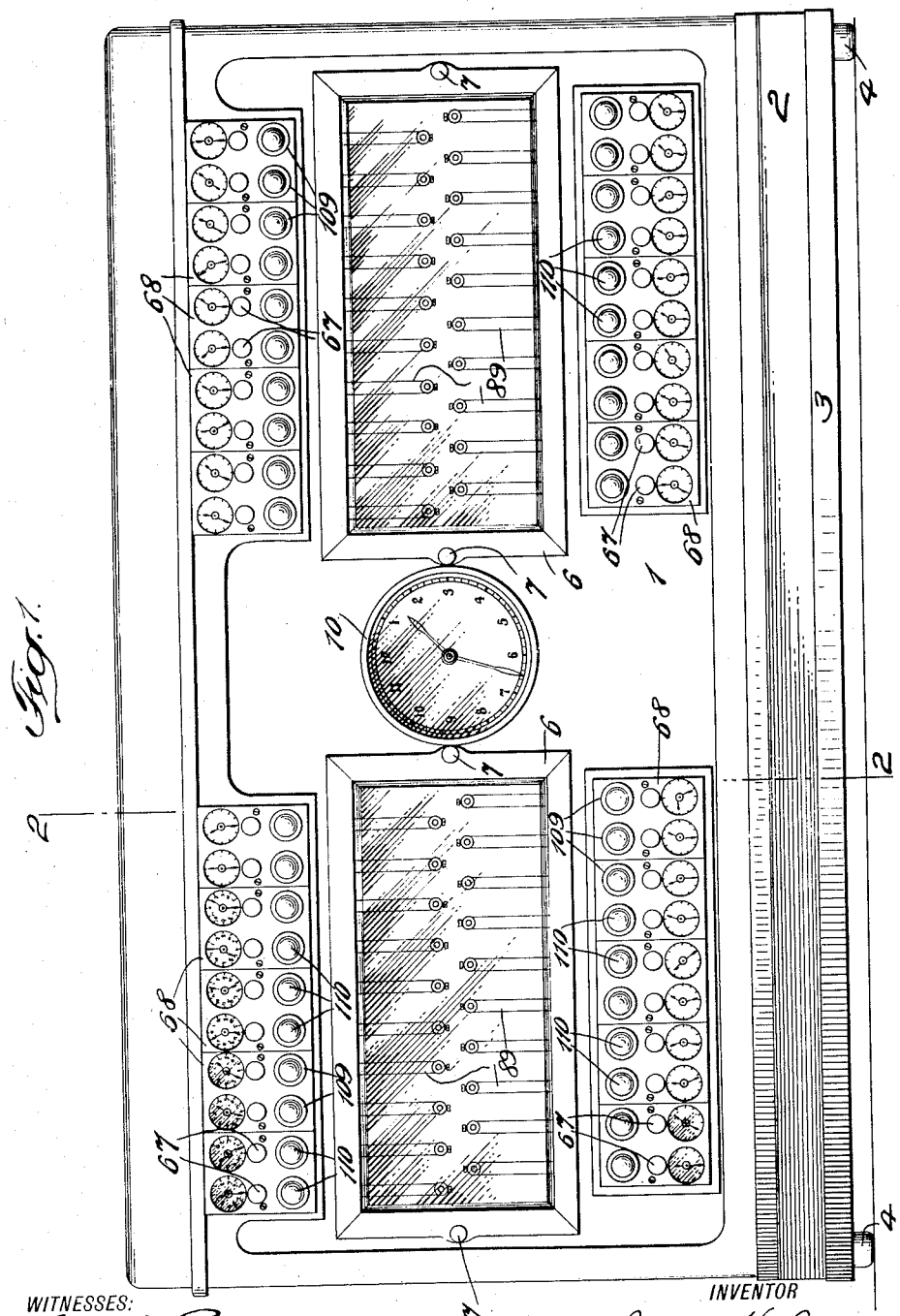

M. H. AVRAM.
EFFICIENCY RECORDER.
APPLICATION FILED OCT. 8, 1915.

1,309,235.

Patented July 8, 1919.
4 SHEETS—SHEET 1.

M. H. AVRAM.
EFFICIENCY RECORDER.
APPLICATION FILED OCT. 8, 1915.

1,309,235.

Patented July 8, 1919.
4 SHEETS—SHEET 2.

WITNESSES:

INVENTOR
Moïs H. Avram
BY
M. H. Lockwood
ATTORNEY

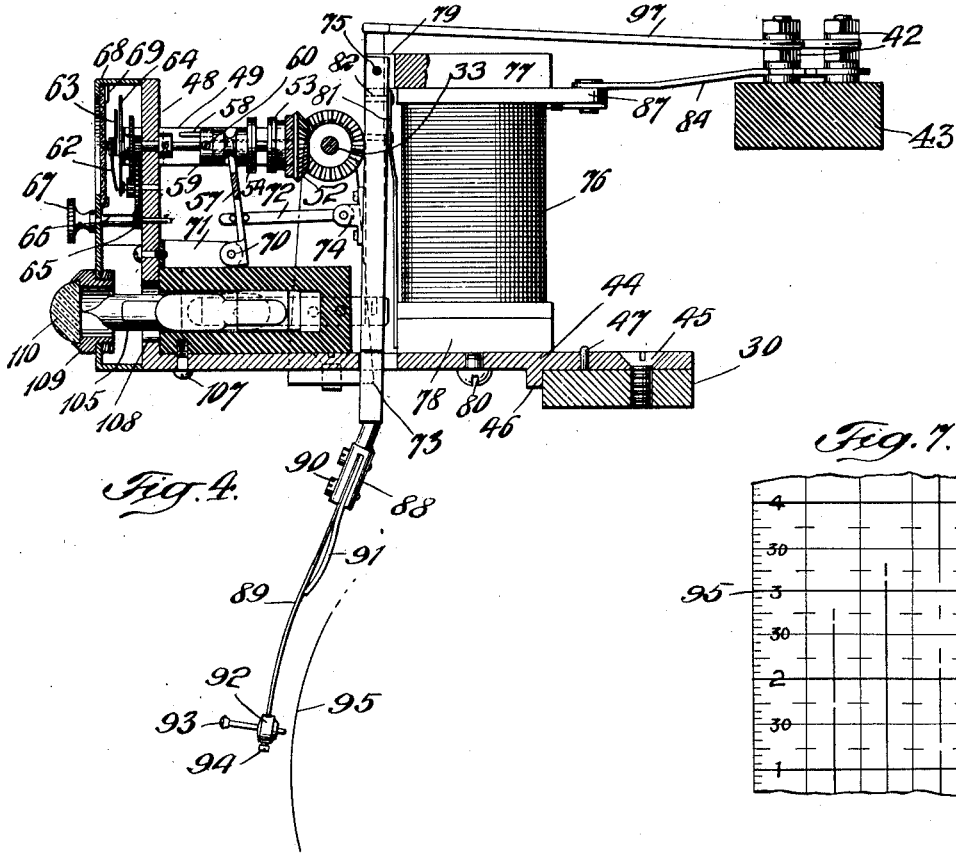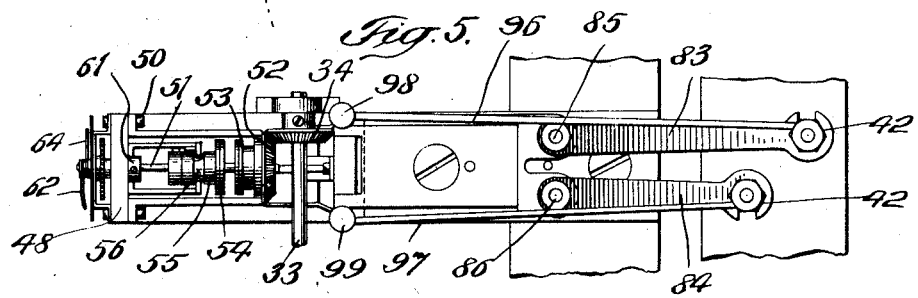

UNITED STATES PATENT OFFICE.

MOÏS H. AVRAM, OF NEW YORK, N. Y., ASSIGNOR TO SLOCUM, AVRAM AND SLOCUM, INC., OF NEW YORK, N. Y., A CORPORATION OF NEW YORK.

EFFICIENCY-RECORDER.

1,309,235.  Specification of Letters Patent.  Patented July 8, 1919.

Application filed October 8, 1915. Serial No. 54,786.

*To all whom it may concern:*

Be it known that I, MOÏS H. AVRAM, a citizen of the United States, and resident of New York city, county and State of New York, have invented certain new and useful Improvements in Efficiency-Recorders, of which the following is a specification.

My invention relates more particularly to efficiency recorders adapted to give to the factory manager certain information such as the working time of each machine it is desired to control, and the periods of operation thereof. My improved apparatus is adapted to give this information, thus enabling the manager to determine the capacity and efficiency of each machine and of the plant, as well as indicating the faithfulness and skill of the attendant employee.

My invention herein described is an improvement over the form of apparatus shown and described in my Patent No. 1,131,104 of March 9th, 1915.

The object of the present invention is to simplify the details of construction of certain features and to render the apparatus more efficient and reliable in operation. A further object is to produce a continuous chronographic record of each working period of the machine to be controlled so that a glance at the chart will show the working periods and the intervals of rest of each machine connected with the recording apparatus. I further provide, in the present apparatus, improved means for totalizing the working periods of each machine and a lamp or other suitable signal or indicator adapted to be thrown into operation and kept in indicating position throughout each working period of the machine under control. The coöperation of the mechanism of each unit of my apparatus is such that the recording, totalizing and indicating mechanism operate or perform their functions simultaneously and continuously during each working period of the machine.

The form of apparatus here shown and described is particularly adapted for the control of machines operating to produce a continuous product such as looms, knitting machines, cordage machines, wire making and covering machines, flour and paint mills, etc., but, obviously, the apparatus can be installed and adapted to control machines of various kinds.

The form of apparatus here shown and described preferably comprises a plurality of units mounted in a single casing and operated in conjunction with a single motor driven clock adapted to drive one or more drums upon which the chronographic chart or charts are mounted. Each unit is adapted to be operated from a single machine in the factory or plant, the connections between the machine and its corresponding recording unit being of any suitable character such, for instance, as shown in my application Serial No. 36,942, filed June 29, 1915.

Figure 2:
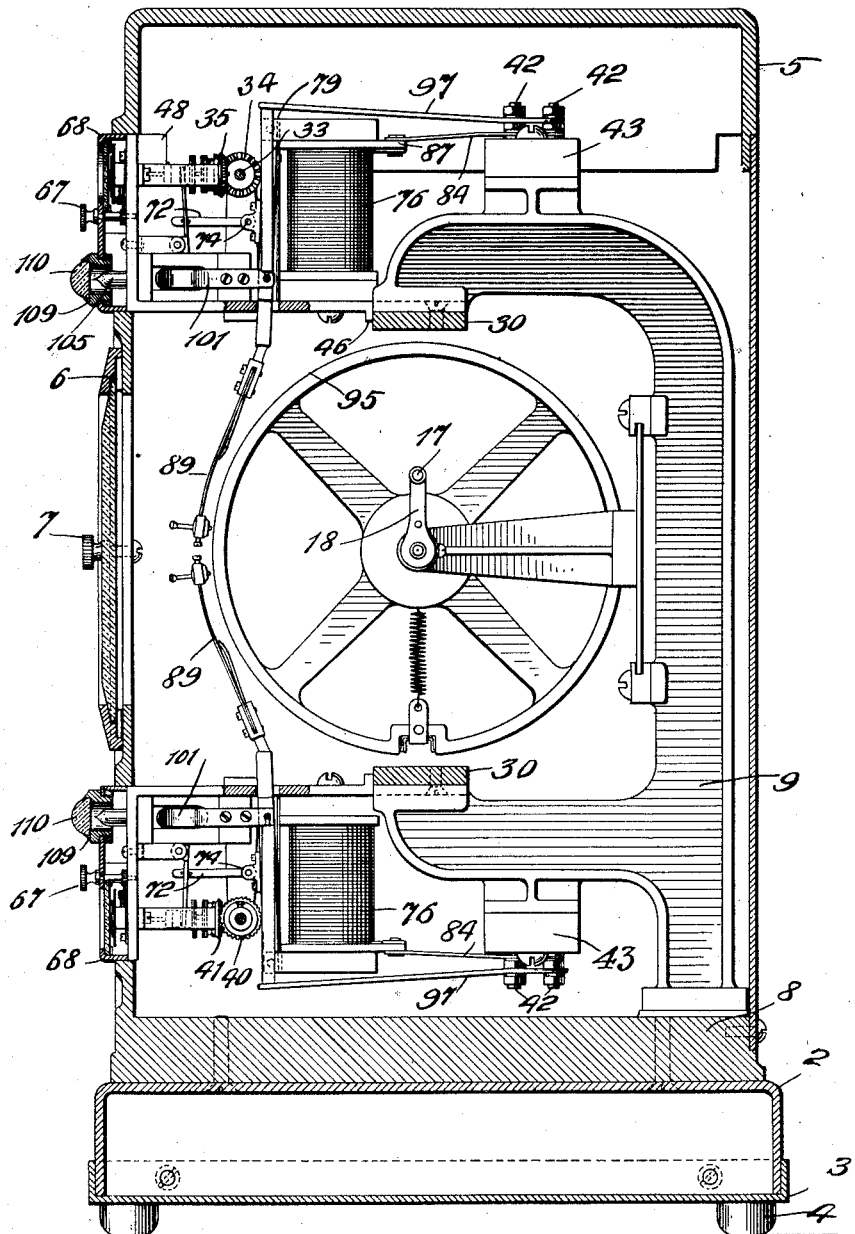
Figure 3:
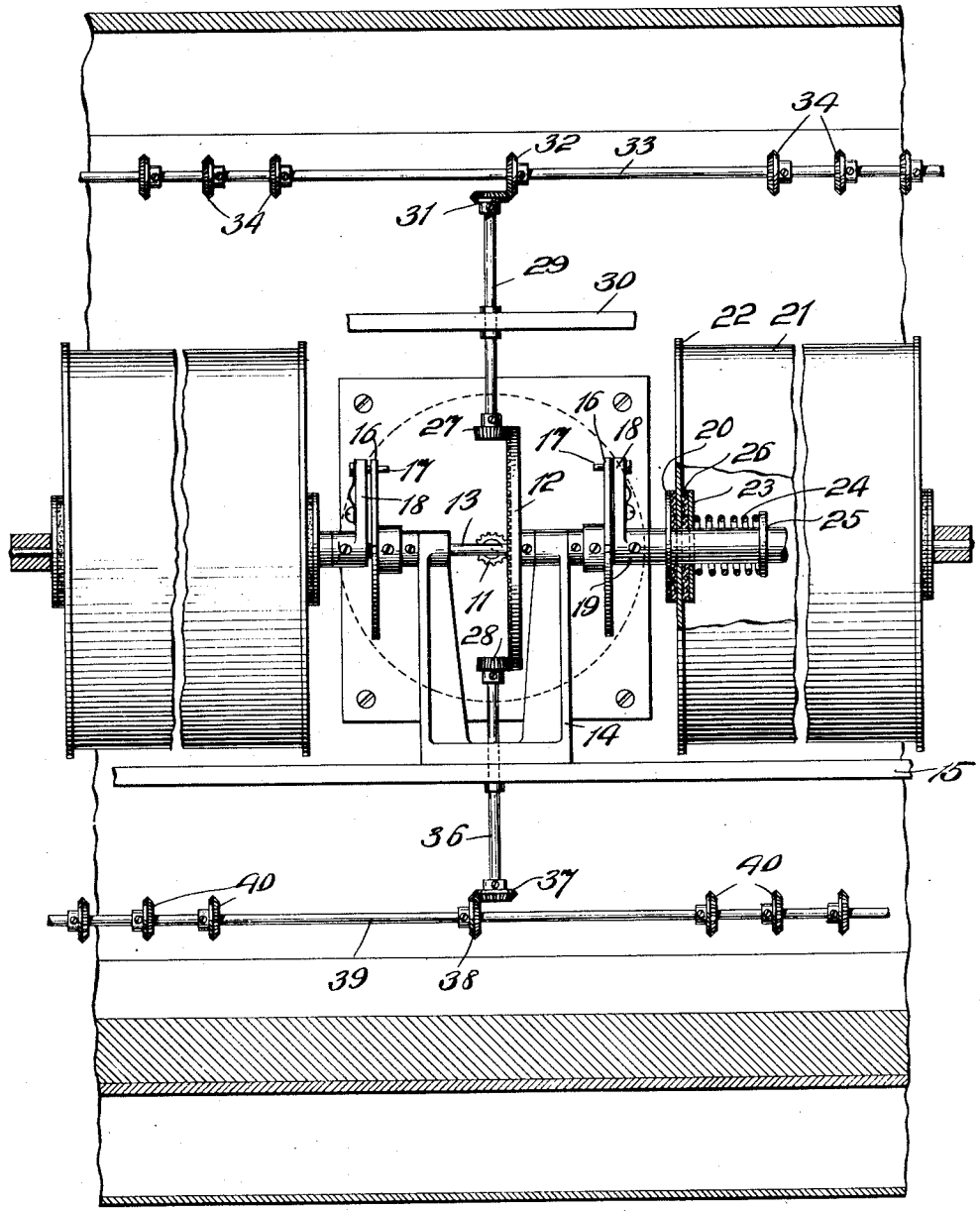

My invention is best described and will be more clearly understood by reference to the accompanying drawings in which Figure 1 is a front elevation of my improved apparatus having a capacity of forty units; Fig. 2 is a vertical transverse section of the apparatus, substantially on the line 2—2 of Fig. 1; Fig. 3 is a partial longitudinal vertical section with many parts removed so as to show the gear connections operated by the clock; Fig. 4 is a partial section and side elevation of one of the units; Fig. 5 shows a top plan view of one of the units; Fig. 6 is a sectional detail of the indicator lamp, and Fig. 7 represents a portion of the chronographic chart.

Referring to the drawings, 1 represents the casing of the apparatus and comprises a base 2 preferably made hollow for the placing of batteries or the like therein. The bottom of the base is closed by a plate 3 provided with suitable feet 4 of rubber or the like. The top 5 of the casing is preferably made removable so that the mechanism may be gotten at for adjustment or repairs and for making the necessary electrical connections. The front of the casing is preferably provided with removable panels 6 fitted with plate glass for inspection of the recording drum. The thumb screws 7 being provided so that the panels may be removed for adjusting the stylus with reference to the drum. The interior of the case is provided with a base 8, upon which are mounted the supporting brackets 9 adapted to carry the various mechanisms, including recording drums and the units hereinafter described. The motor driven clock 10 is preferably mounted in the front wall of the casing and its dial exposed to view. The central minute stem of the clock is preferably extended rearwardly and provided with a pinion 11 (Fig. 3) adapted to mesh with the crown gear 12 secured to a shaft 13, the latter being supported for rotation in bearing blocks 14. The latter are preferably mounted upon a bar 15 extending longitudinally of the machine and secured to the frame brackets 9. The ends of the short shaft 13 are provided with disks 16, each having a plurality of notches in the periphery thereof adapted to coöperate with a pin 17 resiliently mounted in an arm 18 projecting from a hub 19 secured to a friction disk 20 and mounted upon a shaft passing through the recording drum 21.

On the inside of the end plate 22 of the recording drum 21 another disk 23 is provided loosely mounted upon the hub or shaft of the drum and has thrusting thereagainst a spring 24 seated against a collar 25. Friction disks 26 of suitable material are placed between the respective disks 20 and 23 on opposite sides of the end plate 22 of the drum 21 so that the latter may be rotated independently of the shaft for adjustment of the chronographic chart relative to the stylus.

This construction is substantially the same as shown and described in my application Serial No. 36,942, filed June 29th, 1912.

The motor of the clock is adapted to drive the series of accumulators of the apparatus and for this purpose I provide bevel pinions 27 and 28 meshing with the crown gear 12, preferably at opposite points above and below the shaft 13, substantially as shown in Fig. 3 of the drawings. The upper pinion 27 is secured to a shaft 29, having pivotal bearing in the upper longitudinal bar 30 secured to the frame brackets 9 of the apparatus.

The upper end of the shaft 29 is provided with a miter gear 31 meshing with the corresponding miter gear 32 secured to a longitudinally arranged shaft 33 which is provided with a plurality of similar miter gears 34 adapted to coöperate with corresponding miter gears 35 adapted to be connected to the accumulating device of each unit of the apparatus substantially as hereinafter described.

The lower pinion 28 above referred to, is similarily connected to a shaft 36 provided with a miter gear 37 meshing with a similar miter gear 38 secured to another longitudinally arranged shaft 39 which is likewise provided with a plurality of miter gears 40 adapted to coöperate with miter gears 41 operating in conjuction with the lower series of time accumulators.

My apparatus may be made in any size desired and may contain as many units as may be required.

The apparatus here shown is adapted to contain forty units each adapted to be connected with a machine to be controlled. The connection between the machine to be controlled and the units of the apparatus may be of any suitable nature or may be substantially like those shown in Fig. 12 of my application Serial No. 36,942 above referred to.

The wires from the machine are brought into the apparatus and connected with suitable binding posts 42 mounted upon a bus bar 43 of insulating material extending longitudinally of the machine and secured to the frame brackets 9 substantially as indicated in Fig. 2 of the drawings.

The upper and lower series of units in the apparatus and their connections and mode of operation are identical, hence it will be necessary to describe but a single unit.

Each unit is mounted upon a frame preferably double as indicated in Fig. 1 of the drawings, each frame thereby accommodating two units. This construction is preferable from a manufacturing standpoint, but has nothing to do with the efficiency of operation of the individual units.

In Fig. 5, however, the frame is represented as mounting a single unit. The frame comprises a base plate 44 secured by suitable screws 45 to one or the other of the longitudinally extending bars 15 and 30, which as previously pointed out are secured to the frame brackets 9. The frame base 44 is preferably provided with a depending flange 46 for properly locating the same with relation to the bar. A dowel pin 47 may also be used to assist in locating and maintaining the respective frames in proper position.

A front plate 48 extending at right angles to the base 44 of each unit frame is adapted to carry certain portions of the mechanism mounted thereon. The front plate 48 (see Figs. 4 and 5) has secured thereto a rearwardly extending bracket 49 which is preferably U shaped and secured thereto by suitable screws 50 and adapted to form a bearing support for the rear end of a shaft 51 and upon which the miter gear 52 is loosely mounted. The miter gear 52 is adapted to mesh with one of the corresponding miter gears 34 or 40 connected with the clock in the manner previously described. The miter gear 52 is preferably secured to a clutch member 53 extending forward and adapted to coöperate with another clutch member 54 slidably mounted upon the shaft 51 and adapted to rotate therewith.

The clutch member 54 is preferably provided with a hub 55 having therein an annular groove 56 adapted to receive the forked end of a lever 57 for sliding the clutch member on the shaft in the usual or any preferred manner. The hub 55 is also provided with a forwardly projecting pin 58 sliding in a hole in the collar 59 secured by a set screw 60 to the shaft 51 substantially as shown in Fig. 4 of the drawings. In this manner the shaft 51 is compelled to turn with the clutch member 54 while the latter can slide freely on the shaft to engage or disengage the clutch member 53.

The shaft 51 is preferably held in proper position in the frame by a collar 61 secured thereto. The forward end of the shaft 51 is suitably connected with the minute hand 62 of the accumulating mechanism, substantially as shown in Figs. 2, 4 and 5 of the drawings. Suitable intermediate gearing is provided for connecting the minute hand with an hour hand 63. This gearing being the usual clock mechanism need not be more fully described.

I have preferably provided, in this connection, means for resetting the hands 62 and 63 which coöperate with the accumulator dial 64, independently of the clock connections. This comprises a pinion 65 engaging the gearing of the hands and secured to the stud 66, provided with a knurled head 67, preferably projecting through a casing or cover plate 68 secured to the front plate 48 of the unit frame for inclosing the accumulator mechanism and an indicator to be described more particularly later. If desired the accumulator dial 64 may be covered by a glass disk 69 in the usual or any preferred manner.

From this arrangement it will be seen that normally the hands of the accumulator mechanism will not be operated for normally the clutch members 53 and 54 are not in engagement. Engagement of the clutch members is adapted to occur only during the operation or working of the machine to be controlled by the particular unit. The lever 57, provided with a fork coöperating with an annular groove in the hub 55 of the slidable clutch member 54 is pivoted at 70 in a bracket 71 secured to the front plate 48 of the machine substantially as shown in Figs. 2 and 4 of the drawings. The lever 57 is preferably provided with a rearwardly extending connecting link 72 pivotally connected to a swinging armature 73 by an ear or bracket 74 projecting from the front face of the armature, although other suitable means may be employed.

The armature 73 is preferably pivoted at 75 to swing in a vertical plane adjacent to an electromagnet 76 provided with pole pieces 77 and 78, the upper pole piece 77 being preferably provided with forwardly extending ears 79 to which the upper end of the armature 73 is pivoted at 75 as will be seen in Fig. 4 of the drawings.

The lower pole piece 78 rests upon base 44 of the unit frame and the magnet is preferably secured thereto by a screw 80. The swinging armature 73, in the present instance, is provided with a spring 81 secured by rivets 82, the lower end of the spring being adapted to contact with the lower pole piece 78 and resiliently hold the lower end of the armature 73 away from the pole piece 78 except when the magnet is energized. The magnet will be energized only when the machine to be controlled by the particular unit is working. This connection of the magnet with the machine to be controlled, as previously indicated, is made through the binding posts 42 to which suitable connecting strips or links 83 and 84 are connected, the inner ends of which, at 85 and 86 respectively, are secured to an insulating plate 87 mounted on the upper end of the electromagnet 76 below the upper pole piece 77 substantially as shown in the drawings. The ends of the magnet coil are connected to the links at 85 and 86 in any suitable manner. Obviously any other suitable connection between the binding posts 42 and the electromagnet 76 may be made.

The lower end of the swinging armature 73 is provided with a head 88 in which is mounted a spring armor finger 89 secured thereto by screws 90 and supported in proper position by a stiff metal finger 91; both the spring and the supporting finger being preferably secured in a slot in the head 88 by the screws 90 as indicated in Fig. 4 of the drawings. The lower end of the spring finger 89 is preferably provided with a head 92 in which the stylus or recording point 93 is adjustably secured by means of a set screw 94. The stylus 93 is adjusted to coöperate with the chronographic chart 95 secured to the face or periphery of the drum 21 which as previously described is connected with and in synchronism with the clock. This coöperation between the stylus and the chart is adapted to take place only when the machine to be controlled is in operation and the electromagnet 76 energized.

It will be understood that the clock mechanism and the recording drum are rotating continuously, but no record will be produced on the chronographic chart until the electromagnet 76 is energized, and then the stylus 93 will be brought into contact with the chart and remain in contact therewith so long as the machine to be controlled is in operation, thus producing a continuous straight line record of each working period of the machine.

It will be further understood that the armature 73 through the link 72 is adapted to move the lever 57, which in turn will throw the clutch members 53 and 54 into coöperative relation, so that the hour and minute hands 62 and 63 of the accumulator will move in synchronism with the clock and with drum 21 during each working period of the machine to be controlled by the particular unit.

Obviously if the electromagnet is deënergized no record will be made upon the chronographic chart because the spring 81 will maintain the armature 73 in its outer position as illustrated in Fig. 4 of the drawings. The connection between the clutch members 53 and 54 and the swinging armature 73 is such that when the armature is in an inoperative position the clutch members will be out of engagement and hence the accumulating hands will remain stationary when the particular machine connected with the unit is not working. Thus the accumulator is adapted to totalize only the working periods of the machine.

When the magnet 76 is energized for a particular unit, I prefer to simultaneously energize an indicator or display signal adapted to indicate that the machine to be controlled by the particular unit is in operation or working. Preferably the indicator comprises an electric lamp. Suitable connecting wires 96 and 97 are secured under the corresponding binding posts 42 to which corresponding links 83 and 84 of the unit are connected. The wires 96 and 97 are preferably connected at their other or forward ends with leads 98 and 99 which are respectively connected to contact plates 100 and 101 secured by screws 102 to an insulating block 103. The insulating block 103 is preferably bored out at 104 and cut away on each side down to the bore, the contact pieces 100 and 101 being bent, as indicated in Fig. 6 of the drawings, so as to enter the bore through the cut away portions of the block and form contact terminals for the indicator lamp 105. The lamp 105 is preferably an elongated bulb provided with terminal plates 106 secured thereto in any suitable manner adapted to coöperate with contact plates 100 and 101 substantially as shown in Fig. 6 of the drawings. The insulating block 103, which forms the lamp socket, is secured to the base plate 44 of the individual units by screws 107 substantially as shown in Fig. 4 of the drawings. The front plate 48 of the unit frame is preferably bored out or provided with a hole at 108 through which the lamp 105 projects. Preferably I insert a thimble 109 in a hole in the front casing 68 and secure in said thimble a lens 110 adapted to be located directly in front of lamp 105 substantially as shown in Figs. 2 and 4 of the drawings.

It will be understood that since the electric light connecting wires 96 and 97 are connected with the same binding posts forming the terminals for the electromagnet 76, that when the magnet is energized the electric light will be lighted simultaneously therewith, thus adapting it to indicate to the observer that the particular machine of that unit is working.

In this form of apparatus, as previously indicated, the records of the respective units are made upon a common chronographic chart mounted upon the drum 21 in any suitable or preferred manner, the records of the upper units alternating with those of the lower units of the apparatus. A portion of one of the charts is shown in Fig. 7 of the drawings, in which it will be observed that records are produced in continuous straight lines during the working periods of the machine, no record being produced when the machine is at rest. Obviously this could be reversed if so desired and other forms of continuous record operated by the machine to be controlled could be produced in a substantially similar manner for each working period of the machine.

The operation of the apparatus will be understood from the description hereinbefore given, but may be briefly stated as follows:

With the machine to be controlled properly connected by a switch which will be closed when the machine is started, the switch being connected with the particular unit controlling the machine, the current, when the machine is started, will come into the unit through the binding posts 42 and energize the magnet and the indicator electric light simultaneously. The magnet will attract its swinging armature 73 in opposition to the spring 81 and hold the same in contact with the lower pole piece so long as the magnet remains energized. The armature through the link 72 will close the clutch 53—54 and the accumulator will move in synchronism with the clock.

The armature 73 will simultaneously carry the stylus 93 into contact with the chronographic chart 95 on the drum 21, and the stylus will remain in contact with the drum to produce a continuous record of each working period of the machine controlled by the particular unit. Thus each machine controls the operation of a recording unit and accumulator unit and the indicator unit, all operating simultaneously throughout each working period of the machine.

It will be understood that I do not wish to be limited to the specific constructions here shown for obviously various modifications in the details of construction and adaptation thereof may be made without departing from the spirit and scope of the invention.

I claim—

1. In an efficiency recorder, the combination of a clock mechanism, a chronographic chart operatively connected therewith, an electromagnet adapted to be energized from the machine the working of which it is desired to control, a pivoted armature, a stylus carried by said armature and adapted to be brought into contact with said chart when said magnet is energized, an accumulator operable by the clock when said stylus is brought into contact with the chart for recording and an indicator adjacent said accumulator adapted to be rendered visible when said magnet is energized, thereby indicating that said accumulator and stylus are operating.

2. In an efficiency recorder, the combination of a clock mechanism, a chronographic chart operatively connected therewith, an electromagnet adapted to be energized from the machine, the working of which it is desired to control, an armature adapted to be actuated when the magnet is energized, a stylus adapted to be brought into contact with said chart by the actuation of said armature, an accumulator normally disconnected from said clock mechanism but adapted to be connected therewith when said magnet is energized, an indicator adjacent said accumulator, and means for rendering said indicator visible when said magnet is energized.

3. In an efficiency recorder including a clock mechanism adapted to operate a chronographic chart, the combination of a supporting frame, an electromagnet adapted to be energized from the machine, the working of which it is desired to control, a stylus adapted to coöperate with said chart when the magnet is energized, an armature effecting said coöperation, an accumulator normally disconnected from but adapted to be connected to said clock mechanism when said magnet is energized, means controlled by said armature for making said connection of the accumulator, and an indicator mounted in said frame adjacent said accumulator adapted to be rendered visible when the magnet is energized.

4. In an efficiency recorder, the combination with a clock mechanism adapted to operate a chronographic chart of a plurality of units symmetrically arranged in coöperative relation to said chart, each unit being adapted to be controlled by a machine the working of which it is desired to control, said units comprising a supporting frame, a single electromagnet, a stylus adapted to coöperate with said chart, an armature adapted to hold the stylus against the chart when the magnet is energized, an accumulator normally disengaged from said clock mechanism, a clutch for connecting said accumulator with the clock mechanism, connecting means between said clutch and said armature whereby the clutch is closed when said magnet is energized and manual means for resetting said accumulator while the same is disconnected from said clock mechanism.

5. In an efficiency recorder, the combination with a clock mechanism adapted to operate a chronographic chart of a plurality of units symmetrically arranged in coöperative relation to said chart, each unit being adapted to be controlled by a machine the working of which it is desired to control, said units comprising a supporting frame, a single electromagnet, a stylus adapted to coöperate with said chart, an armature adapted to hold the stylus against the chart when the magnet is energized, an accumulator normally disengaged from said clock mechanism, a clutch for connecting said accumulator with the clock mechanism, connecting means between said clutch and said armature whereby the clutch is closed when said magnet is energized and an indicator supported in said frame adjacent said accumulator, adapted to be rendered visible when said magnet is energized.

6. In an efficiency recorder, the combination of a cylindrical drum carrying a chronographic chart, clock mechanism for rotating said drum, a driven shaft parallel with the axis of said drum adapted to be rotated by said clock mechanism, a plurality of units mounted symmetrically with respect to said drum and shaft, each comprising a stylus adapted to coöperate with said chart, an electromagnet, an armature adapted to hold the stylus in contact with said chart while said magnet is energized, a counter shaft geared to said driven shaft and extending at right angles thereto, an accumulator adapted to be operated by but normally disconnected from said counter shaft, a clutch for connecting said accumulator to said counter shaft, and a connection between said clutch and said armature whereby the latter is adapted to close said clutch when the stylus is making a record on said chart.

7. In an efficiency recorder, the combination of a cylindrical drum carrying a chronographic chart, clock mechanism for rotating said drum, a driven shaft parallel with the axis of said drum adapted to be rotated by said clock mechanism, a plurality of units mounted symmetrically with respect to said drum and shaft, each comprising a stylus adapted to coöperate with said chart, an electromagnet, an armature adapted to hold the stylus in contact with said chart while said magnet is energized, a counter shaft geared to said driven shaft, an accumulator normally disconnected from said last named shaft, a clutch for connecting said accumulator to said shaft, a connection between said clutch and said armature whereby the latter is adapted to close said clutch when the stylus is making a record on said chart and an indicator adapted to be rendered visible when said magnet is energized thereby indicating that said clutch is closed and the stylus is recording.

In testimony whereof I hereunto set my hand.

MOÏS H. AVRAM.